April 3, 1934.  A. B. WESTERLIND ET AL  1,953,666
METHOD OF MANUFACTURING PISTON RINGS
Filed March 20, 1933
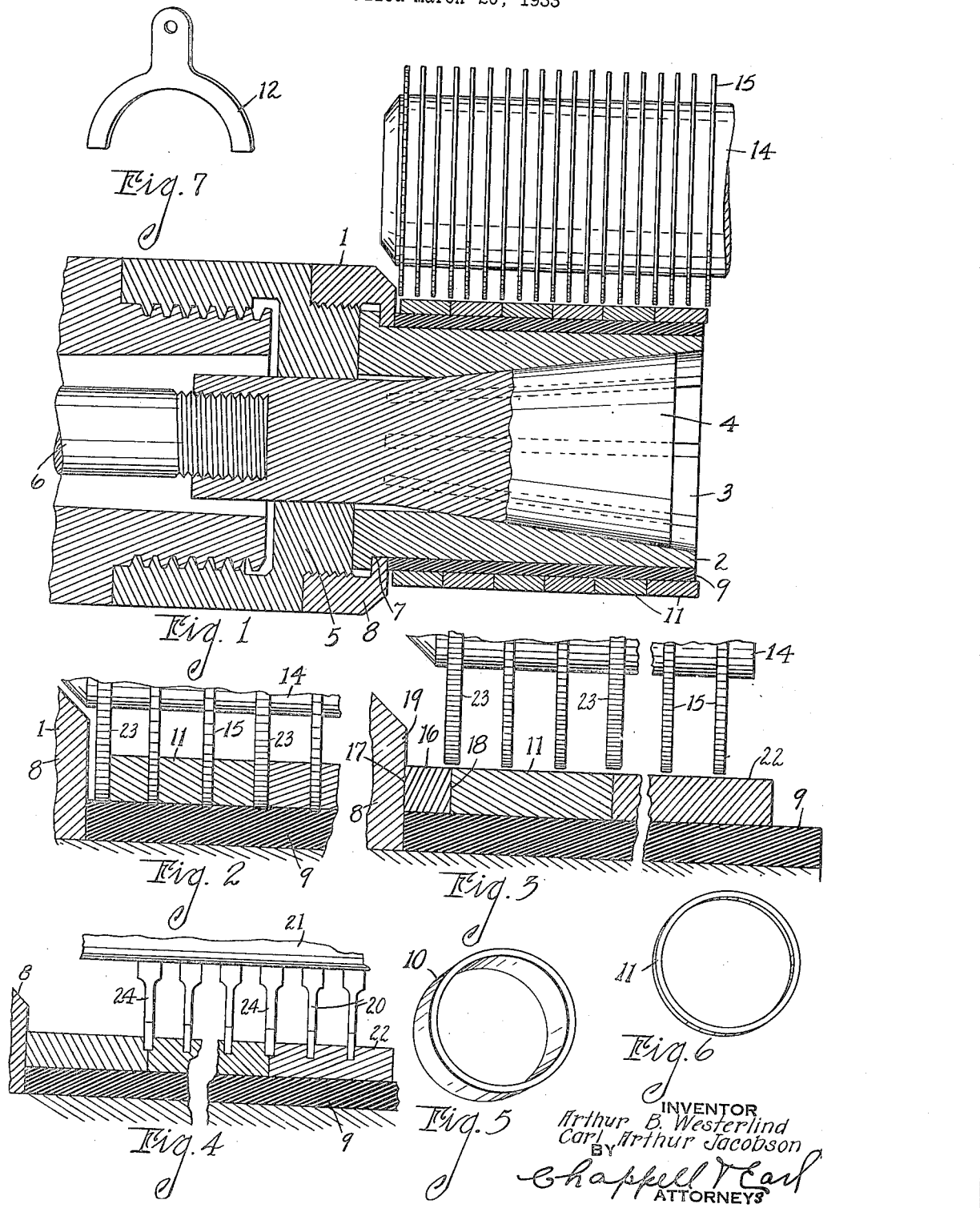

Patented Apr. 3, 1934

1,953,666

UNITED STATES PATENT OFFICE 1,953,666

METHOD OF MANUFACTURING PISTON RINGS

Arthur B. Westerlind and Carl Arthur Jacobson, Hastings, Mich., assignors to Hastings Manufacturing Company, Hastings, Mich.

Application March 20, 1933, Serial No. 661,812

15 Claims. (Cl. 29—156.62)

The main objects of this invention are:

First, to provide a method of making piston rings by means of which piston rings may be accurately produced with a minimum of machine work.

Second, to provide a method of manufacturing piston rings by which rings of great uniformity of tension may be produced.

Third, to provide a method of producing piston rings by which piston rings of uniform width and having parallel end faces or edges may be accurately produced.

Fourth, to provide a method of manufacturing piston rings in which grinding operations are minimized.

Objects pertaining to details and economies of the invention will definitely appear from the description to follow. The invention is defined in the claims.

In the accompanying drawing we illustrate an apparatus for practicing certain steps in our method of manufacture, in which:

Fig. 1 is a fragmentary view partially in section of a machine for simultaneously performing the blank splitting and facing operation of our method.

Fig. 2 is a fragmentary view partially in section illustrating the saw unit in fully actuated position.

Fig. 3 is a fragmentary view partially in section illustrating another arrangement of saws and arrangement of the work upon the arbor.

Fig. 4 is a fragmentary view partially in section illustrating a device employing lathe tools as distinguished from saws or rotary cutters, the parts being shown mainly in conventional form, but also illustrating another position of the work.

Fig. 5 is a perspective view of one of the multiple ring blanks, no attempt being made to accurately illustrate the slight deformation or out-of-round feature or shape of the blank.

Fig. 6 is a perspective view of one of the sawed rings before splitting, no attempt being made to show its slightly out-of-round character.

Fig. 7 is a perspective view of a spacing tool for use in chucking or placing the ring castings upon the arbor as illustrated in Fig. 1.

In the manufacture of piston rings it has been quite common practice to form single ring castings and to finish by rough grinding and finish grinding operations. This requires a large amount of machine work and great care must be exercised to produce, and it is difficult to produce, rings having their end faces in exactly parallel planes.

Packings rings have also been manufactured by providing castings several inches in length and splitting these into rings, but we believe this method has been generally abandoned owing to the fact that the rings thus produced varied greatly in tension and many rings were defective, the defects possibly not developing or being discovered until the rings had been put into use. Further, in so-called long pot castings the grain of the iron is quite open, while in our castings hereinafter described a closer grain of iron is secured.

We are also aware that rings have been formed of ring blank castings of a width of two rings, the castings being split centrally, but in that case the ends of the castings were rough ground prior to the splitting operation and still a large amount of machining was involved, although the resulting rings were of more uniform tension than when the ring blank casting was made of considerable length.

Our method has the advantages of all the rings being of substantially uniform tension, grinding is minimized, and the end faces or edges of the rings are parallel. A substantial layer of the scale and end skin of the casting is removed so that the resulting rings are of very uniform quality.

In the accompanying drawing we illustrate such portion of the machine as are directly associated with the practice of the method. We provide a driven work arbor 1 having an expanding chuck comprising a plurality of segmental jaws 2 having conically tapered inner surfaces 3 at their outer ends coacting with the expanding cone 4, which is slidably supported in the collar 5 threaded upon the arbor. The expanding cone is adjustable by means of the threaded spindle 6.

The jaws 2 have flange portions 7 at their inner ends engaged by the retaining sleeve 8 overlapping these flanges. The jaws are embraced by a rubber 9 upon which the annular ring blank castings 10 are mounted in edge to edge abutting relation. These ring blank castings are in the embodiment illustrated the width of three rings 11, plus the stock that is removed by the machine operations.

When the ring blank castings are arranged on the chuck or arbor as shown in Figs. 1 and 2, a yoke-like spacer 12 is employed for spacing the inner ring blank casting upon the arbor away from the head of the arbor in order to accommodate one of the saws or other tools, that is, to provide clearance for the end cutter.

The ring blank castings in practice are formed slightly out of round so that when a portion of the ring is cut out to form a split. The resulting split ring when closed is in the form of a true circle. This practice of forming the ring blank casting slightly out-of-round is well understood in the art and we have made no attempt to properly illustrate that condition in Figs. 5 and 6. The chuck or arbor provided with the sleeve effectively accommodates this slight irregularity and insures an effective supporting of the rings without the necessity for undue stress or endwise clamping of the work.

A multiple cutter designated generally by the numeral 14 is provided, the tools preferably saws 15 being uniformly spaced upon the arbor the axis of which is parallel to the axis of the work arbor. Means are provided in the machine for feeding the cutters to the work, or the work to the cutters, as may be desired. It will be noted that the work is arranged upon the arbor relative to the cutters so that certain of the cutters are centered relative to the joints between the ring casting blanks. In the embodiment shown in Figs. 1 and 2 the end cutters are in operative relation to the outer edges of the outer casting blanks.

With the parts thus arranged the cutters simultaneously split the ring castings, in the embodiment illustrated into three rings, or, more properly, ring blanks, 11, and trim or face the abutting edges and also the outer edges of the end ring blank, with the result that the scale and a portion of the casting skin at the end of the casting is removed and the ring blanks 11 are formed with exactly parallel edges or end faces, so it is only necessary to finish grind and split the rings to provide rings of uniform width and also of substantially uniform tension. This method of machining greatly reduces machine work as there is no preliminary grinding of the castings necessary, but of perhaps more importance is the great uniformity in rings which results in the speed and economy of manufacture.

We have not illustrated the finish grinding operation and the splitting operation as they may be performed by any suitable means.

Providing the work arbor with a rubber sleeve permits the blanks to be sawed completely. The cutter arbor is stopped as soon as the blanks are completely severed so the sleeves are effective for use for a long period of time. In use a slight groove will be formed in the planes of the cutter so the sleeves are not mutilated by the cutters.

In the chucking arrangement shown in Fig. 3, instead of spacing from the shoulder of the work arbor in chucking the casting blanks so that a cutter will face the inner edge of a casting blank, the cutter for facing the outer edge of the outer casting blank is omitted, thereby providing one ring blank 16 at each operation having a machine face 17 and an untrimmed or unfaced face 18. This ring blank 16 in chucking up a series of rings is disposed with its faced edge 17 against the head 19 of the arbor and its unfinished edge in abutting relation to a ring casting blank, one of the cutters being arranged in alinement with these abutting edges as shown in Fig. 3.

In the embodiment shown in Fig. 4 the cutters 20 are in the form of lathe tools mounted upon a suitable support 21, these parts being shown conventionally. In the chucking here illustrated the outer ring 22 is arranged upon the arbor so that it is only trimmed or cut on its inner face. This trimmed face of the ring 22 in the succeeding operation is then placed the same as the blank 16 as shown in Fig. 3. All three methods of chucking are entirely practical.

In the embodiment shown in Fig. 3 the cutters 23 which perform the facing operation are wider than the other cutters and in the embodiment shown in Fig. 4 the corresponding cutters 24 are wider than the other cutters which results in the removing of more of the scale and casting skin and in ring blanks of more uniform tension and hardness, thereby resulting in a more uniform product than has before been attained without excess cost.

Our method of manufacturing piston rings enables the very economical production of superior rings in that the rings are of uniform width and their end faces in parallel planes, and only finish grinding of the rings is required. Rough grinding is entirely eliminated.

The rings are also all of substantially uniform tension, the advantage of the relatively small casting being retained, but the end scale is removed and sufficient of the "casting skin" is removed to result in substantial uniformity, as stated.

It will be understood that in the finishing operations the rings may be slotted or otherwise machined to produce different types of rings. It is believed that this disclosure will enable those skilled in the art to practice our method in a very efficient manner.

Having thus described our invention what we claim as new and desire to secure by Letters Patent is:

1. The method of manufacturing piston rings, including the steps of mounting a plurality of annular blank castings, each of a width of a plurality of rings plus stock to be removed in machining thereof, an abutting edge to edge relation, simultaneously splitting the ring blank castings into rings by a plurality of saws arranged in parallel relation and spaced the width of a ring with certain of the saws facing the abutting edges of the two ring blank castings and other saws splitting the ring blank castings whereby the plurality of ring blank castings are simultaneously divided into a plurality of rings of uniform width and having parallel edges, and finish grinding the edges of the rings.

2. The method of manufacturing piston rings, including the steps of mounting a plurality of annular ring blank castings, each of a width of a plurality of rings plus stock to be removed in machining thereof, in abutting edge to edge relation, simultaneously splitting the ring blank castings into rings by a plurality of saws arranged in parallel relation and spaced the width of a ring with certain of the saws facing the abutting edges of the two ring blank castings and other saws splitting the ring blank castings whereby the plurality of ring blank castings are simultaneously divided into a plurality of rings of uniform width and having parallel edges.

3. The method of manufacturing piston rings, including the steps of mounting a plurality of annular ring blank castings, each of a width of a plurality of rings plus stock to be removed in machining thereof, in abutting edge to edge relation upon an expanding arbor provided with a rubber sleeve, and simultaneously splitting the ring blank castings into rings by a plurality of saws arranged in parallel relation and spaced the width of a ring with certain of the saws facing the abutting edges of the two ring blank castings and other saws splitting the ring blank castings whereby the plurality of ring blank castings are simultaneously divided into a plurality of rings of uniform width and having parallel edges.

4. The method of manufacturing piston rings including the steps of mounting a plurality of multiple ring castings in abutting edge to edge relation and in operative relation to a multiple saw with the joints between the ring castings in the central plane of certain of the saws whereby the ring castings are divided into a plurality of rings having parallel saw cut edges, splitting and facing the ring castings and finish grinding the edges of the rings.

5. The method of manufacturing piston rings including the step of mounting a plurality of multiple ring castings in abutting edge to edge relation and in operative relation to a multiple saw with the joints between the castings in the central plane of certain saws, such saws being wider than the saws acting to split the blanks whereby the ring castings are divided into a plurality of rings having parallel saw cut edges, and splitting and facing the ring castings.

6. The method of manufacturing piston rings including the steps of mounting a plurality of multiple ring castings in abutting edge to edge relation and in operative relation to a multiple cutter with the joints between the ring castings in the central plane of certain of the cutters whereby the ring castings are divided into a plurality of rings having parallel cut edges, and splitting and facing the ring castings.

7. The method of manufacturing piston rings including the step of mounting a plurality of multiple ring castings in abutting edge to edge relation upon an expanding arbor provided with a resilient sleeve and in operative relation to a multiple cutter with the joints between the ring castings in the central plane of certain of the cutters whereby the ring castings are divided into a plurality of rings having parallel saw cut edges, and splitting and facing the ring castings.

8. The method of manufacturing piston rings including the steps of mounting a plurality of annular ring blank castings, each of a width of a plurality of rings plus stock to be removed in machining thereof, in abutting edge to edge relation upon an arbor, and simultaneously cutting the ring casting blanks into rings and trimming the abutting edges of the ring blank castings.

9. The method of manufacturing piston rings comprising simultaneously splitting into a plurality of rings and removing the edges of a plurality of piston ring blank castings, each of a width of a plurality of rings and arranged in abutting edge to edge relation, the abutting edges of an adjacent pair of rings being simultaneously faced with a single cutter.

10. The method of manufacturing piston rings including the step of simultaneously splitting into rings and facing the edges of a plurality of multiple ring blanks arranged with their edges in abutting edge to edge relation.

11. The method of manufacturing piston rings including the steps of mounting a ring blank casting in operative relation to a plurality of parallel cutters, and simultaneously splitting the blank casting into a plurality of rings, and facing the edges of the casting simultaneously with splitting it, the facing cutters being wider than the splitting cutters.

12. The method of manufacturing piston rings including the step of mounting a plurality of multiple ring castings in abutting edge to edge relation and in operative relation to a plurality of spaced parallel cutters with the joints between the castings in the central plane of certain cutters such cutters being wider than the blank splitting cutters whereby the ring castings are divided into a plurality of rings having parallel edges, and splitting and facing the ring castings.

13. The method of manufacturing piston rings including the steps of mounting a ring blank casting in operative relation to a plurality of parallel cutters, and simultaneously splitting the blank casting into a plurality of rings, and facing the edges of the casting simultaneously with splitting it.

14. The method of making rings, which comprises simultaneously cutting each of a plurality of ring blank cylinders into a plurality of rings, and facing the ends of the cylinders simultaneously with cutting them.

15. The method of making rings, which comprises simultaneously dividing a ring blank cylinder into a plurality of rings, and facing the ends of the cylinder simultaneously with dividing it.

ARTHUR B. WESTERLIND.
CARL ARTHUR JACOBSON.